July 11, 1944. F. J. TOPP Re. 22,516

SMOKING PIPE

Original Filed Feb. 10, 1941

INVENTOR.
Fred J. Topp
BY Spencer, Marshall, Johnston & Cook
Att'ys.

Reissued July 11, 1944

Re. 22,516

UNITED STATES PATENT OFFICE 22,516

SMOKING PIPE

Fred J. Topp, Springfield, Ohio

Original No. 2,309,482, dated January 26, 1943, Serial No. 378,142, February 10, 1941. Application for reissue May 3, 1943, Serial No. 485,481

5 Claims. (Cl. 131—215)

This invention relates to smoking pipes. More particularly, it relates to means for preventing the accumulation of tobacco condensates in the pipe by vaporizing them and venting the vapors into the outside air.

While it has been proposed heretofore to use some absorbent material for gathering to itself liquids which accumulate in the bottom of the bowl and in the stem of a pipe during smoking, no provision has been made for the removal of the liquids from the absorbent material. On the contrary, the theory of such pipes is that when the absorbent material has become saturated with such liquids, the absorbent material will be removed from the pipe and discarded, its place being taken by clean absorbent material. While this arrangement is very helpful in preventing undesirable liquids from reaching the mouth of the smoker, the absorbent material must constantly be changed. Moreover, a filter which is soaked with tobacco yellow is not effective in removing bitterness from the smoke being carried to the mouth.

Accordingly, the first object of this invention is to provide a means for collecting smoking pipe liquids in absorbent material, vaporizing the liquids, and venting the vapors to the atmosphere. One of the features of this invention is the provision of a recess in the bottom of a pipe adjacent to the bowl and a portion of the smoke duct, which recess is filled with absorbent material and then closed by a foraminous plate. The ends of the recess are connected to the bottom of the pipe bowl and to the smoke duct so that any liquids in the smoke duct or pipe bowl will be diverted to the recess. The liquids accumulated in the absorbent material commence to vaporize when the pipe becomes warm and the vapor escapes through the foraminous plate into the atmosphere.

Another object of this invention is to assist this vaporization of the undesirable liquids in the absorbent material by providing a heater element capable of establishing heat conductive relationship between the high heat inside the tobacco bowl and the absorbent material. In order to effect this purpose, applicant positions a strip of heat conductive material in such a way that one end is within the pipe bowl and the other end is within the recess in which is disposed the absorbent material. By this arrangement the absorbent material is maintained at a comparatively high temperature so that it is possible to vaporize the liquids or to maintain highly moist vapor received by the pipe as a vapor and discharge it into the atmosphere.

These and such other objects as may hereinafter appear are obtained in one embodiment of this invention shown in the drawing, wherein.

Figure 3:
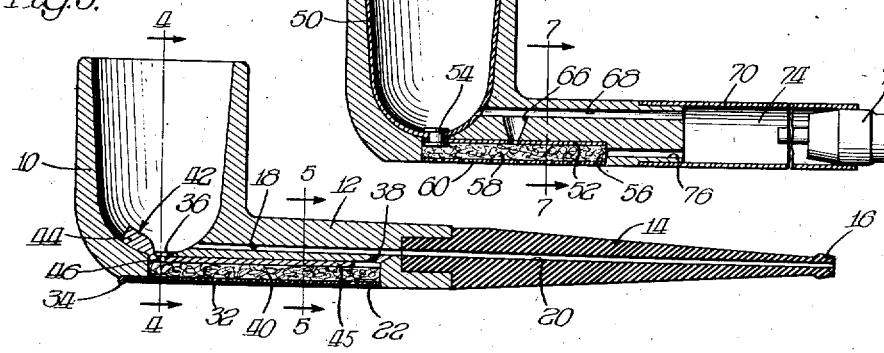
Figure 3 is a view in section taken along the line 3—3 of Figure 1, showing the relationship of the heater element, the absorbent material and the foraminous plate.

Continuing to refer to the drawing and particularly to Figure 3, there is shown a conventional pipe comprising a bowl member 10 having integral therewith a short stem section 12 in which is mounted by any suitable means a stem 14 having a bit 16. A smoke duct 18 in the stem portion 12 and a smoke duct 20 in the stem 14 provide a smoke passageway from the bowl 10 to the bit 16.

Figure 1:
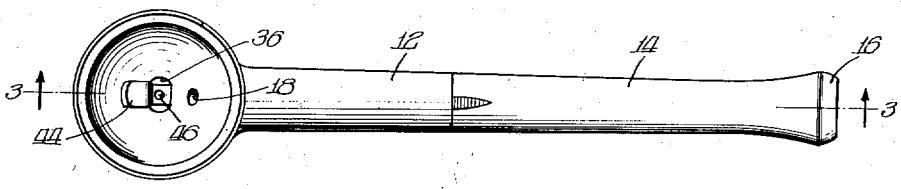
Figure 1 is a plan view of a pipe showing applicant's heater element in the bowl thereof.
Figure 2:
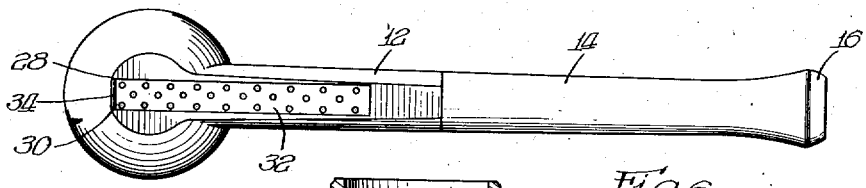
Figure 2 is a bottom view of a pipe showing the foraminous plate.
Figure 5:
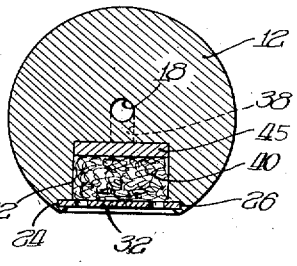
Figure 5 is a transverse section of the pipe taken on a line looking in the direction of 5—5 of Figure 3.

The means for absorbing and vaporizing undesirable liquids are disposed in a recess 22, which as may be seen in Figure 5 is rectangular in cross-section. Along lower edges of the recess and cut into the walls of the stem portion 12 are two channels 24 and 26 which, referring to Figure 5, have their ends 28 and 30, see Figure 2, open so that a strip of foraminous metal which may be referred to as a vent plate 32 may be slipped into the channels 24 and 26 so as to close the bottom of the recess 22. Referring to Figures 2 and 3, the outer end of the vent plate 32 has a downwardly turned end portion 34 which provides gripping means for the insertion or withdrawal of the vent plate 32 from the channels 24 and 26.

An opening 36 provides communication between the bowl 10 and the recess 22 and the passageway 38 establishes communication between the smoke duct 18 and the recess 22. Absorbent material 40 is disposed in the recess 22 and due to the conjoint action of the opening 36 and the passageway 38 receives all of the liquids entering the pipe whether they come from the bowl or from the stem.

By the arrangement shown, assuming that a heater element 42 is not employed, applicant's pipe will cause to drain into the absorbent material 40 all liquids and due to the heat in the base of the bowl these liquids will have a tendency to vaporize and discharge through the holes in the vent plate 32.

In order to further assist such vaporization, applicant provides a heater element 42 which comprises an enlarged heat absorbing end portion 44 positioned in the base of the bowl 10 with a long extending heat dissipation end 45 positioned between the top of the recess 22 and the absorbent material 40. A hole 46 through the heater element 42 permits liquids collecting at the bottom of the pipe to reach the absorbent material 40. The heat absorbing end 44 of the heating element 42 may be of various configurations. In order to assist in the cleaning of the recess 22 and of the bowl 10, it is desirable that the heating element 42 be removable either by drawing the heat absorption end 44 downwardly through the recess 22 or by drawing the heat dissipation end 44 upwardly out through the bowl 10. As shown in Figure 3, the heat absorption end 44 has a configuration such that it may be drawn downwardly through the hole 36.

In practice, the absorbent material 40 is not loose, as shown in Figure 5, but is in the form of a strip of absorbent paper, commonly called an absorbent cartridge, which may be removed as a unit. The fibres of the absorbent cartridge are tightly packed so as not to permit the vent plate 32 to impair the draw of the pipe. The heater element 42 is not fastened into the recess 22 but is simply held there by the combined action of the absorbent cartridge and the vent plate 32.

Figure 4:
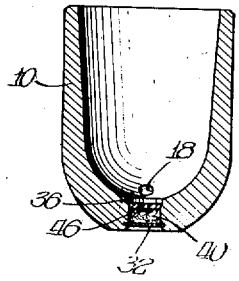
Figure 4 is a transverse section of the pipe taken on a line looking in the direction of 4—4 of Figure 3.

The advantages of this smoking pipe are evident. When in use, liquids whether they be condensates in the pipe bowl or from the mouth will be diverted by the opening 36 and the passageway 38 to the absorbent material 40. This material will become quite hot due to the action of the heating element 42. This heating element may be varied in size to suit requirements but the embodiment shown in Figures 3, 4 and 5, functions satisfactorily.

In use, the absorbent material 40 does not become wet to nearly the same degree as absorbent filters which are fully enclosed in the stem. The recess 22 does not become filled with water, on the contrary the liquids seem to be continuously discharged into the atmosphere and only the nonvolatile ingredients of the liquids remain in the absorbent material. The absorbent material becomes caked with a yellow substance which is the non-volatile portions of these tobacco condensates.

Figure 6:
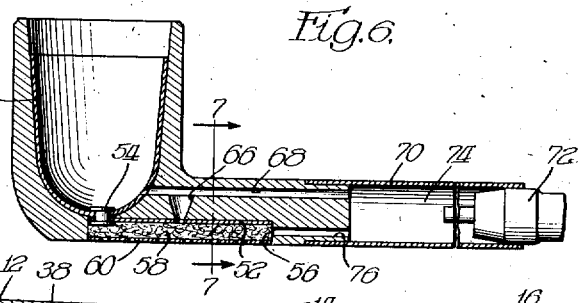
Figure 6 is a view in section of a second embodiment of applicant's invention.
Figure 7:
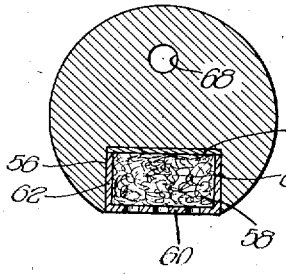
Figure 7 is a view taken on the line 7—7 of Figure 6.

Another embodiment of applicant's invention is presented in Figure 6. In this embodiment, the comparatively small heat absorbing end portion 44 of the heating element 42, see Figure 3, is replaced by a metallic wall insert 50, see Figure 6, which is connected to a heater element 52 by any suitable means such as a rivet 54. The heater element 52 is positioned in a recess 56 of a size sufficient to hold absorbent material 58 held therein by a foraminous plate 60. The foraminous plate 60 may be held in position by means of the same construction shown in Figures 2 and 3 for the plate 32 or it may be of a channel construction having side walls 62 and 64, see Figure 7, which frictionally engage the walls of the recess 56. It will be observed that in this embodiment of the invention shown in Figure 6 the metallic wall insert 50 and the heater element itself becomes a permanent part of the pipe and is not removable. Under these circumstances it has been found desirable to drain condensates from the bowl to the absorbent material 58 through a duct 66 from the smoke duct 68. In this embodiment of the pipe, a metallic cooling element 70 comprising a sleeve is disposed between the stem portion of the pipe itself and a bit member 72. Communications between the open chamber 74 created by this metallic cooling element 70 and the absorbent material 58 is obtained by means of the duct 76. A cooling chamber 74 may be considered as a part of the main bore or passageway from the bore to the mouthpiece.

The embodiment shown in Figure 6 is called a preferred embodiment in that experiment shows that it has great capacity to vaporize liquids accumulating in the absorbent paper 58.

Having thus described my invention, what I claim as new and desire to secure by Letters Patent of the United States is:

1. A smoking pipe comprising a unitary bowl and shank and a mouthpiece, a lower portion of the bowl and shank respectively each having a recess coaxially arranged and forming a channel closed at its ends, a bore extending from the bowl towards the mouthpiece, a cooling chamber between the shank and the mouthpiece, an intermediate portion of the space of the channel having vertical communication with the bore and the end of the channel towards the mouthpiece having communication with the cooling chamber, metallic means positioned in the cavity of the bowl and running lengthwise of the channel, removable absorbent within the channel in contact with the metallic means and a removable metallic channel member constituting a part of the bottom of the bowl and shank and having its opposite walls in contact with the first metallic means, said metallic channel member having vents in the bottom portion thereof.

2. A smoking pipe comprising a unitary bowl and shank and a mouthpiece, a lower portion of the bowl and shank respectively each having a recess coaxially arranged and forming a channel closed at its ends, a bore extending from the bowl to the mouthpiece, the bowl end of the channel having communication with the bowl and the mouthpiece end of the channel having communication with the bore, metallic means positioned in the cavity of the bowl and in the channel, said metallic means in the channel extending substantially to the point of communication of the channel with the mouthpiece end of the bore, a removable absorbent within the channel in contact with the metallic means, and a removable metallic member constituting a part of the bottom of the bowl and shank and having vents therein between the channel and the atmosphere.

3. A smoking pipe comprising a bowl and shank and a mouthpiece, a lower portion of the bowl and shank respectively having a recess coaxially arranged and forming a channel closed at its ends, a main bore extending from the bowl towards the mouthpiece, means communicating with said bore to cause a current of air to pass through said channel in the direction of the mouthpiece when the pipe is smoked, metallic means positioned in the cavity of the bowl and in the channel, said metallic means in the channel extending lengthwise towards the mouthpiece end of the channel, a removable absorbent within the channel in contact with the metallic means and a removable metallic member constituting a part of the bottom of the bowl and shank, said metallic member having vents in the bottom portion thereof.

4. A smoking pipe comprising a bowl and shank and a mouthpiece, a lower portion of the bowl and shank respectively having a recess coaxially arranged and forming a channel open at the bottom, a removable closure member for the bottom of said channel provided with openings therein forming vents between the channel and the atmosphere, a removable absorbent material substantially filling said channel, heat conducting metallic means positioned in the tobacco holding cavity of the bowl and running lengthwise of said channel substantially in contact with said absorbent material, a main bore extending from the bowl to the mouthpiece independently of said channel to permit a main current of air to pass through the cavity of the bowl, the main bore and the mouthpiece, and means to enable a current of air to pass through said channel in the direction of the mouthpiece when the pipe is smoked, said means comprising a plurality of passageways communicating with the space of the channel, one of said passageways being disposed near the mouthpiece end of the channel and the other being disposed near the bowl end of the channel, said passageways being in communication with the main current of air passing through the cavity of the bowl, the main bore and the mouthpiece.

5. A smoking pipe comprising a bowl and shank and a mouthpiece, a lower portion of the exterior of the bowl having a recess forming a channel open at the bottom, a removable closure member for the bottom of said channel provided with openings therein forming vents between the channel and the atmosphere, a removable absorbent material substantially filling said channel, a main bore extending from the bowl to the mouthpiece independently of said channel to permit a main current of air to pass through the cavity of the bowl, the main bore and the mouthpiece, and means to enable a current of air to pass through said channel in the direction of the mouthpiece when the pipe is smoked, said means comprising a plurality of passageways communicating with the space of the channel, one of said passageways being disposed near the mouthpiece end of the channel and the other being disposed near the bowl end of the channel, said passageways being in communication with the main current of air passing through the cavity of the bowl, the main bore and the mouthpiece.

FRED J. TOPP.